United States Patent [19]

Roche et al.

[11] 4,444,401
[45] Apr. 24, 1984

[54] FLOW DIVERTER SEAL WITH RESPECTIVE OBLONG AND CIRCULAR OPENINGS

[75] Inventors: Joseph R. Roche, Humble; William L. Clark, Houston, both of Tex.

[73] Assignee: Hydril Company, Los Angeles, Calif.

[21] Appl. No.: 449,377

[22] Filed: Dec. 13, 1982

[51] Int. Cl.³ .................... F16J 15/06; E21B 33/035
[52] U.S. Cl. .................................. 277/30; 277/177; 277/237; 166/84; 166/87; 166/88; 166/363; 166/374
[58] Field of Search ................. 277/30, 31, 138, 165, 277/237R; 166/84; 166/87; 166/88; 166/363; 251/1 A, 1 B, 1 R, 63; 137/812, 819

[56] References Cited

U.S. PATENT DOCUMENTS

| 1,467,877 | 9/1923 | Rea | 277/33 X |
|---|---|---|---|
| 2,484,622 | 10/1949 | Hartman | 137/812 X |
| 3,587,734 | 6/1971 | Shaffer | 277/31 X |
| 3,741,295 | 6/1973 | Murman et al. | 251/1 R X |
| 3,926,256 | 12/1975 | McCall | 251/1 R X |
| 4,085,942 | 4/1978 | Yoshida et al. | 277/30 |
| 4,378,849 | 4/1983 | Wilks | 251/1 R X |

FOREIGN PATENT DOCUMENTS

| 650054 | 9/1928 | France | 277/237 |
|---|---|---|---|
| 557432 | 2/1957 | Italy | 277/237 |
| 135811 | 12/1919 | United Kingdom | 277/237 |
| 1191766 | 5/1970 | United Kingdom | 277/237 |

*Primary Examiner*—Robert S. Ward
*Attorney, Agent, or Firm*—Dodge & Bush

[57] ABSTRACT

A seal member of elastomeric material which is shaped to fit sealably within a recess of a flow diverter body. On the inside of the diverter body, a seal is effected against a slidable cylindrical valve sleeve. On the outside of the diverter body, a seal is effected against a permanent housing. The seal is constructed with an outer section having a generally circular opening, an inner section having an oblong opening and a connecting section between the outer and inner section having a bore therein connecting the circular opening with the oblong opening. A rigid support member embedded in the elastomeric material provides rigidity and strength to the seal member.

9 Claims, 18 Drawing Figures

FLOW DIVERTER SEAL WITH RESPECTIVE OBLONG AND CIRCULAR OPENINGS

BACKGROUND OF THE INVENTION

The invention disclosed herein relates to a diverter apparatus and system for redirecting the flow of drilling fluid or mud and cuttings that would otherwise be blown upward to the rig floor during a kick encountered during initial hole drilling. The invention disclosed and claimed herein relates to a seal used in an apparatus and system adapted for use beneath the drilling floor of any land or marine drilling rig but in particular, the apparatus and system in which the seal is used find application with floating drilling equipment.

DESCRIPTION OF THE PRIOR ART

When drilling an oil or gas well, an initial large diameter bore hole is established to shallow depths. Protective drive conduit or conductor pipe, typically thirty (30) inches in diameter, is secured in the shallow bore through which the drilling takes place. For offshore drilling, a subsea riser extends from the sea floor to the mariene drilling platform. Flow diverters are typically provided below the rig floor and between the conductor conduit and the rotary table of the drilling rig for the purpose of safely venting unbalanced well bore pressure which may produce an upward flow of drilling fluid in the conduit having sufficient impetus to issue from the top of the conduit thereby contributing a hazard to personnel and equipment. Such an occurrence, called a "kick", typically of formation gas accumulations in the fluid of the conduit is often encountered in top hole drilling making a flow diverter essential before blowout preventers are connected to the drilling system, especially for offshore applications. A flow diverter is considered necessary for safe operation on a floating offshore drilling rig where blowout preventers are placed on the sea floor only after the casing has been set to a depth, usually several hundred feet below the sea floor.

Prior diverter systems have been primarily of two types. The first includes a flow diverter assembly requiring different diameter packing inserts to accommodate different diameter tubular members. Such diverter systems are unable to accomplish complete shut off on open hole. The second has included an annular blowout preventer placed above the vent line in which a valve is disposed to an open condition only when the annular blowout preventer is closed about the drill pipe or other object in the well bore in response to a kick in the annulus of the bore hole.

In the first type of flow diverters, packer elements must be changed for different size tubulars used during drilling and must be removed during tripping of the bottom hole assembly. Such a task is rigorous drudgery to the rig personnel. The well bore is in general left unprotected when there is no object in the well bore because the diverter is not able to close on open hole.

In the second type of flow diverter system the combined height of the annular blowout preventer and of the side outlets of the vent line below the annular blowout preventer may require excessive head room under the rig floor.

For both types of systems which have been provided in the past, a significant safety problem has arisen due to the requirement of opening an external valve in the vent line and closing the valve leading typically to the shale shaker of the drilling rig fluid system. In the past, such valves have often been closed by rig personnel while testing the flow diverter, but after the flow diverter has been made operational during drilling, the external valves inadvertently have been allowed to remain closed. On occasion, the control system elements have been inadvertently incorrectly connected resulting in simultaneous closure of all of the diverter system valves and the diverter itself. If the prior flow diverters have closed about the annulus of a drill pipe or other object in the well bore, such flow diverter systems have created an extremely dangerous situation, and in fact in some cases they have exploded with the result of loss of life and property.

It is an object of the invention to be described below, to provide a diverting system which is failsafe; that is, when a kick occurs during drilling of a shallow hole well before a blowout preventer has been provided, that kick cannot be accidently confined by the flow diverter apparatus itself to build pressure and explode, even if controls are misconnected or malfunctioning.

It is another object of the invention to provide a flow diverter system in which no insert packers are required to be changed for different size tubulars, thereby saving rig time, drudgery and operational decisions on the rig floor, and in which flow may safely be diverted at any time, even when no object is in the diverter bore.

It is a further object of the invention to provide a flow diverting apparatus which, on the occurrence of a kick in the annulas of a drilling conduit, may be caused to close the flow line to the drilling fluid system, to open a vent line for diverting drilling fluid away from the rig and to close the annulus of the bore about a drilling pipe or other object in the conduit or on open hole.

It is a further object of the invention to accomplish not only the opening of a vent line and the closing of the line to the rig drilling fluid system but also to completely close the vertical flow path of the bore in the absence of pipe or other object in the bore.

It is a further object of the invention to provide a complete integral system requiring but one operation to achieve closing of the flow line to the rig drilling fluid system, opening of an overboard vent line and closing the vertical flow path of the annulus of the bore.

It is a further object of the invention to provide an extremely simple, safe system without external valves, operators, linkages and controls.

It is a further object of the invention to provide ease of installation of the novel flow diverter system below the drilling rig floor.

It is further object of the invention to provide automatic alignment of the flow diverter apparatus below a permanently installed housing, vent line and flow line.

It is a further object of the invention to provide means for easy alignment of the flow diverter apparatus in a permanently installed housing below the floor of a drilling rig.

It is another object of the invention to provide sealing means in the housing of the flow diverter apparatus to seal about vent and flow lines permanently installed in a housing below the rig floor.

It is a further object of the invention to provide a system which on command safely and automatically opens a vent line and closes a flow line to the rig drilling fluid system before the annulus of the bore hole is closed.

SUMMARY

The invention disclosed and claimed herein relates to a seal member for use in an apparatus adapted for connection to a drilling conduit beneath a drilling rig floor for changing the direction of flow of pressurized well bore fluid in the conduit away from the rig and sealing the annulus between a pipe or other object or closing the vertical flow path of the conduit in the absence of any object in the conduit. The apparatus includes a housing having a body portion with a generally vertical bore therethrough and having first and second outlet passages provided in the wall of the body. Disposed within the housing are an annular packing element and first and second concentrically arranged annular pistons.

The integral seal member according to the invention is provided about each of the outlet passages in the wall of the diverter. The seal member, constructed of elastomeric material, has an outer section conforming generally with the curvature of the outside of the cylindrical housing wall, has a generally circular opening therein to conform with the substantially circular hole on the exterior of the housing wall and has one or more generally circular sealing shoulders disposed outwardly from the circular opening. The seal member also has an inner section adapted to conform generally with the curvature of the inside of the cylindrical housing wall and has an oblong opening therein to conform with the oblong hole in the wall with one or more oblong sealing shoulders disposed outwardly from the oblong opening. A connecting section between the outer section and the inner section and has an inward warped surface bore geometrically defined by the surface connecting the circular hole with the oblong hole.

The seal is supported and stiffened by means of an integral rigid support member embedded in the elastomeric material and having an outer section disposed about the outer opening, an inner section disposed about the warped surface geometrically defined by the bore connecting the circular hole with the oblong hole and an inner section disposed about the inner opening.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown, of which.

DESCRIPTION OF THE INVENTION

Figures 1, 4, 4A:
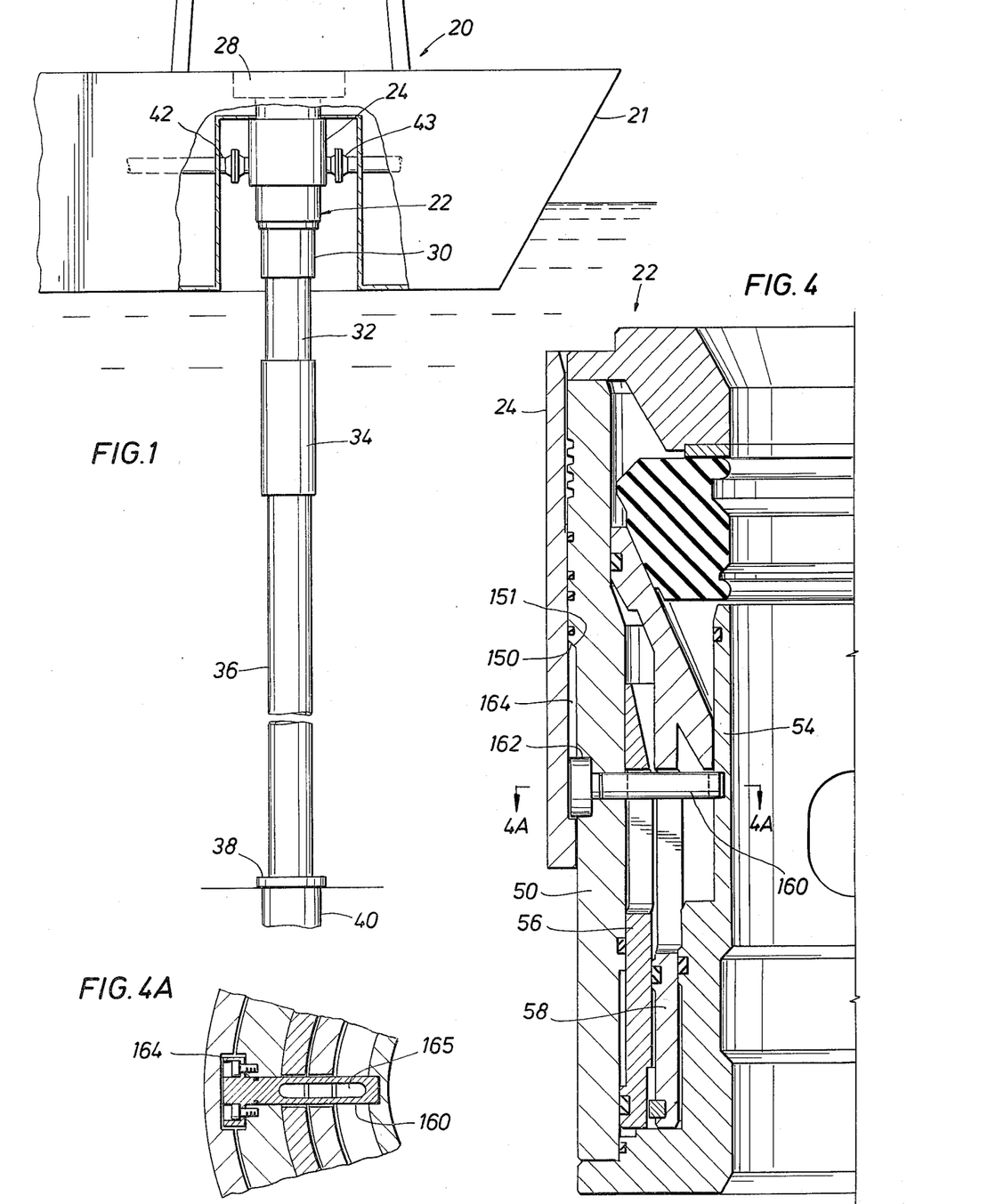
FIG. 1 illustrates a drilling rig of a floating drill ship, barge or semi-submersible to which the flow diverting apparatus is attached beneath the rig floor and above drilling conduit extending to the subsea surface.
FIG. 4 illustrates an alignment key according to the invention by which the flow diverter may be inserted into a permanent housing and aligned angularly with respect to the permanent housing.
FIG. 4A illustrates in more detail the alignment key shown in FIG. 4.

FIG. 1 illustrates a drilling rig 20 of a floating drill ship, barge or semi-submersible 21. The flow diverter of the invention shown generally at 22 is provided below the drilling rig 20 in a permanently installed housing 24 which is mounted below the rotary table 28 of the drilling rig 20. The diverter 22 is connected to a drilling conduit 30, in this case a ball or flex joint for connecting to a riser inner barrel 32. Typically in a drilling system of a floating vessel, a telescopic joint 34 allows for the heave, surge and sway of the vessel and riser joints 36 extend to the sea floor at which a well head member 38 is provided above a thirty (30) inch conduit 40 into the earth's surface.

It should be emphasized that while the preferred environment in which the flow diverter and system according to the invention are illustrated is with marine drilling from a floating vessel, the invention may also be used for marine drilling from a bottom supported platform or for land drilling from a land based rig. FIG. 1 also illustrates a vent line means 42 and a flow line means 43 which may be permanently provided and fixed to the housing 24. The connection of the flow diverter 22 to housing 24 and vent line and flow line means will be described in detail below.

Figure 2:
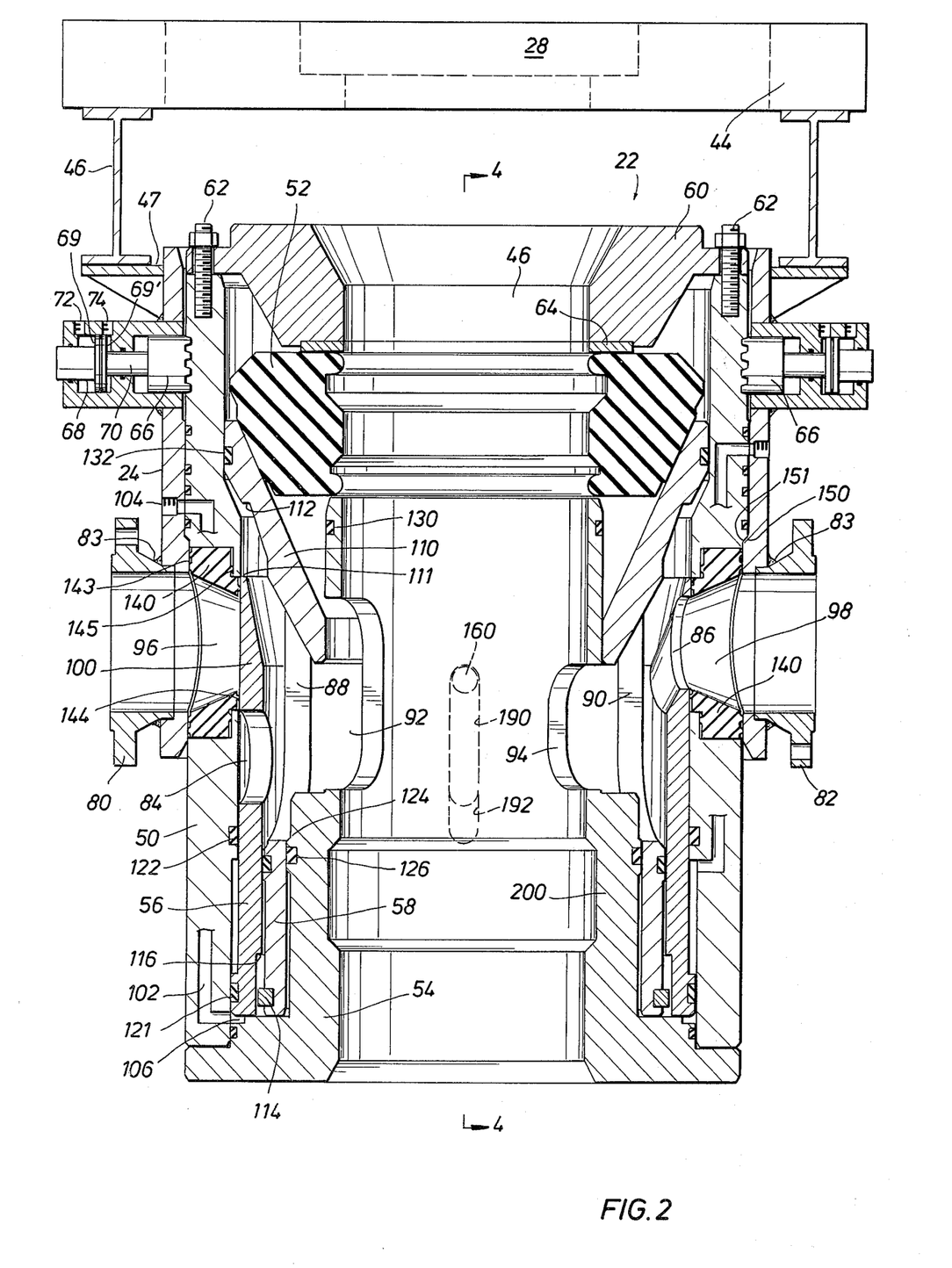
FIG. 2 illustrates a preferred form of the flow diverting apparatus according to the invention in place within a housing and connected to vent and flow lines where the housing and vent lines are fixed beneath a drilling rig floor.

Turning now to FIG. 2, the preferred form of the flow diverter and system according to the invention is disclosed. The diverter 22 is shown in place within a housing 24 which is mounted below the rig floor 44 in which the bore 46 of diverter 22 is in line with the bore of the rotary table 28. The width of the diverter 22 is advantageously designed so that it may be lowered through the rotary table into engagement with permanently affixed housing 24. Housing 24 is fixed with respect to the rig floor 44 by means of I beams 46 which are attached by support members 47 as illustrated.

Diverter 22 comprises a generally cylindrical body 50 in which an annular packing element 52 is disposed in its upper part. The diverter includes a base 54 the upper part of which partially supports annular packing element 52. An annular space between the base 54 and the outer body 50 is provided to contain a first piston, outer valve sleeve 56, and a second piston, annular piston 58. Annular piston 58 is generally of the kind used in annular blowout preventers. The upper part 110 of piston 58 is in the shape of a conical bowl for engaging the packing element 52 in a conventional fashion. Head 60 forms the top part of the flow diverter and is connected to body 50 by means of studs 62. A spacer or wear ring 64 confines the packing element 52 within the flow diverter housing.

The flow diverter according to the invention fits within the bore of permanently mounted housing 24 and is attached by means of a latching mechanism thereto, such as multi-shouldered dogs 66 which engage complementary grooves in the diverter body 50. The dogs 66 are driven by a piston 68 and rod 70. A latch port 72 is provided for applying pressurized hydraulic fluid behind the piston 68 to drive dog 66 into engagement with the diverter body 50. An unlatch port 74 is provided for driving piston 68 away from the diverter body thereby unlatching the dogs 66. Advantageously, the area of the piston 68 on its latch side 69 is smaller than on its unlatch side 69' to facilitate unlatching even where the dogs have been jammed or stuck.

Flow lines are permanently mounted with housing 24 according to the invention. Vent line means 80 and drilling fluid flow line means 82 are shown permanently attached to the housing 24, the attachment being, for example, by welds 83, but the flow line means may be attached advantageously by bolting or other attaching means. The vent line means 80 extends away from the drilling rig such that when the diverter opens the bore of the drilling conduit to the vent line, pressurized drilling fluid may be vented away from the drilling rig and, in the case of a drilling vessel, may be directed to the leeward side of the vessel. The flow line means 82 is preferably directed to the drilling fluid system of the drilling rig, most likely to the shale shaker, where drilling cuttings which have been washed by the drilling fluid are removed from the fluid and where the fluid may be re-entered into the drilling system in conventional fashion.

According to the invention, the first piston or valve sleeve 56 is provided with two passages or holes 84 and 86 provided in its wall. Likewise, the annular piston 58 has two holes 88 and 90 provided in its wall as illustrated in FIG. 2. In addition, holes 92 and 94 are provided in the wall of the base 54. Likewise, holes 96 and 98 are provided in the body wall 50 of the diverter and, after insertion in housing 24, are in alignment with the vent line means 80 and the flow line means 82.

FIG. 2 illustrates the flow diverter according to the invention in its normal state during which drilling operations are conducted through its bore and in which the return of the drilling fluid via the annulus is conducted. The bore of the diverter is provided for fluid communication with the bore of the drilling conduit attached beneath the diverter 22 as illustrated in FIG. 1. Drilling fluid is returned to the drilling rig "mud" or fluid system via the hole 94 in the base, the hole 90 in the annular piston and thence through the hole 86 in the annular sleeve 56 and the hole 98 in the wall of the body for fluid communication through the flow line means to the drilling rig fluid system. On the other hand, the upper part 100 of the valve sleeve 56 covers the hole 96 provided in the body 50 such that no drilling fluid from the interior of the diverter is allowed to communicate with the vent line means 80. Thus, during normal drilling operations the annular packer 52 is in its normal relaxed position leaving an annular space between any pipe or object and the bore of the diverter and fluid communication exists between the bore of the diverter and the flow line means 82.

Hydraulic fluid conduit 102 is connected to a source (not shown) of pressurized hydraulic control fluid via a port 104 for applying pressurized hydraulic fluid beneath valve sleeve piston 56 and annular piston 58. During a "kick," an operator may open port 104 to the source of pressurized hydraulic fluid wherein the pressurized fluid is applied to region 106 beneath the valve sleeve 56 and the annular piston 58.

According to the invention, the valve sleeve 56 is caused to move in an upward axial direction before the annular piston 58, because more area is provided underneath valve sleeve 56 than is provided under annular piston 58, because of the opposing effect of the annular packing element 52 on the conical bowl portion 110 of annular piston 58 and because it has less mass relative to annular piston 58 opposing the motion. During a kick, hydraulic fluid under valve sleeve 56 and annular piston 58 drives valve sleeve 56 upward whereby the hole 86 in valve sleeve 56 is driven upwardly and out of alignment with the hole 98 in the body wall. Simultaneously, hole 84 in the wall of valve sleeve 56 is driven upwardly and into alignment with hole 96 in the wall of the body 50.

The annular piston 58 begins to move after the valve sleeve 56 and in so doing the upper conical bowl portion 110 of piston 58 forces the packing element 52 radially inwardly. As valve sleeve 56 moves upwardly, the upper surface 111 of the sleeve 56 is adapted to engage with downward facing shoulder 112 on the conical bowl portion 110 of piston 58 providing additional upward force to piston 58 until valve sleeve reaches its maximum upward travel. Piston 58 continues to move upwardly until the annulus between a drill pipe or other object in the well bore and the bore of the diverter is closed off.

Figure 3:
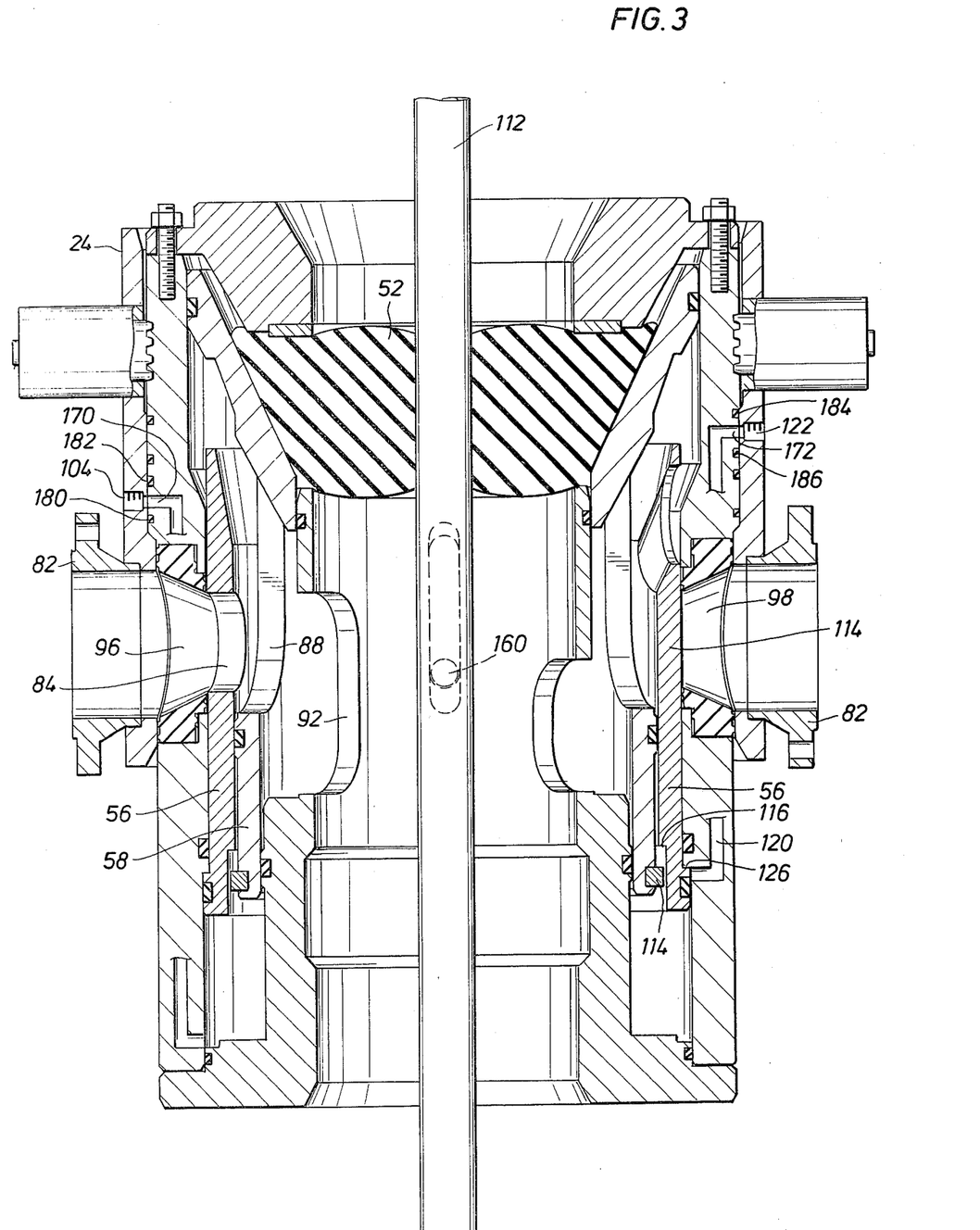
FIG. 3 illustrates the flow diverting apparatus in which an annular packing element has been closed about a pipe in the bore of the apparatus and in which a vent line has been opened and a flow line has been closed.

FIG. 3 illustrates the diverter after the annular piston 58 and the valve sleeve 56 have moved to their "actuated" positions and have caused annular packing element 52 to close about pipe 112 in the bore of the diverter. Hole 84 of valve sleeve 56 has moved into alignment with hole 96 allowing fluid communication via hole 92 provided in the base of the diverter and the hole 88 provided in the annular piston 58 wall. Any pressurized drilling fluid in the bore of the diverter is safely diverted away from the drilling rig via vent line means 82. Hole 88 is sufficiently large that flow between the bore of the body via hole 92 is not prevented when piston 58 moves upwardly.

The lower part 114 of valve sleeve 56 is shown in FIG. 3 covering the hole 98 which is in alignment with the flow line means 82, thereby preventing further fluid communication between the bore of the diverter and the flow line means 82 to the drilling fluid system. Closing of the flow line means 82 thereby prevents the flow of possibly highly combustible, pressurized drilling fluid to the rig drilling fluid system. For the case of a floating drilling rig, the fluid system may be in a confined part of the drilling vessel and could create an extremely hazardous condition if the flow of drilling fluid pressurized with gas from an underground formation is not terminated as quickly as possible.

As best shown in FIG. 2, another feature of the invention includes a means by which the valve sleeve 56 is prevented from failing to close the flow line means 82 and to open the vent line means 80 during kick. A ring 114 provided in the lower part of the annular piston 58 is provided for engagement with an annular shoulder 116 of valve sleeve 56. If the valve sleeve 56 were to become stuck and fail to move upwardly on the application of hydraulic fluid beneath its area 106, the ring 114 of piston 54 on its upward movement would engage the shoulder 116, thereby forcing the valve sleeve 116 upwardly. The ring 114 would force sleeve 56 upward until hole 84 becomes aligned with hole 96 thereby opening the bore of the diverter to the vent line means 96 and simultaneously causing the lower part of the valve sleeve 56 to cover hole 98 in the bore of the diverter thereby preventing further fluid communication to the drilling rig fluid system.

Means are provided to return the flow diverter to its normal position after any emergency has been corrected. Hydraulic line 120 is provided via port 122 for connection to a source of pressurized hydraulic control fluid to an area 126 above a shoulder provided in the bottom of the valve sleeve 56. When hydraulic fluid via port 104 is removed, application of pressurized hydraulic fluid via port 122 drives valve sleeve 56 downwardly to its normal position. Shoulder 116 in engagement with ring 114 forces annular piston 58 downwardly to its rest or normal position.

A plurality of sealing means are provided to contain either pressurized hydraulic fluid under the valve sleeve 56 and annular piston 58 or to seal about other openings and holes in the pistons and body walls. For example, sealing means 121 and 122 prevent pressurized hydraulic fluid beneath valve sleeve 56 from escaping into the interior of the diverter. Likewise, valve sealing means 124 and 126 seal against loss of hydraulic fluid beneath annular piston 58. Sealing means 130 and 132 provide sealing for the upper conical bowl section 110 of annular piston 58 as it moves upwardly for forcing annular packing element radially inward. Integral seals 140 are provided on the wall 50 of the diverter 22 for sealing the wall 50 of the diverter against the wall of the permanent housing 24 and also for providing a seal with the valve sleeve 56 as it moves across the openings 96 and 98 in the wall of the body. A detailed description of the seals 140 is presented below.

Turning now to FIG. 4 which shows a portion of a cross-section through the line 4—4 shown in FIG. 2, means are provided for aligning the diverter 22 within the permanently mounted housing 24. As discussed earlier, the diverter is adapted to be lowered by the drilling rig travelling block through the rotary table and into the bore of housing 24. Means are provided for aligning the diverter 22 both axially and angularly such that the holes 96 and 98 are in alignment with the permanently mounted vent line means 80 and the flow line means 82 which are permanently attached to the housing 24. Axial alignment is achieved by providing an inwardly facing annular shoulder 150 in the permanent housing 24 and a complementary outwardly facing shoulder 151. Engagement of the complementary shoulders 150 and 151 causes the diverter to come to rest at the proper axial or vertical alignment within the housing 24.

Angular alignment is accomplished by means of an alignment key 160 extending through the wall 50, the valve sleeve 56 and the annular piston 58 into engagement with base 54. The head 162 of the key 160 partially extends outwardly from the wall 50 for engagement into an axial slot 164 provided in a portion of the wall of housing 24. The key 160 serves to prevent angular rotation of valve sleeve 56 and annular piston 58 thereby insuring that the holes 84 and 86 of the valve sleeve 56 and the holes 88 and 90 of the annular piston 58 do not move out of angular alignment once the diverter is in place within the permanent housing 24. The outward extension of the head 162 of key 160 fitting within the slot 164 insures that the diverter 22 is aligned angularly with respect to housing 24 such that the hole 96 in the body wall is in alignment with the vent line means 80 and the hole 98 is in alignment with the flow line means 82. Slot 164 in the housing provides the means by which the head extension 162 insures the angular alignment.

Slot 165 illustrated in FIG. 4A is provided in the key 160 so that drilling fluid within the annular space extending between the holes 92 and 94 of the base 54 and holes 88 and 90 of the annular piston 58 is not impeded from moving up or down by the key itself, but rather may move freely through the key. As may best be seen again in FIGS. 2 and 3, the hydraulic fluid ports 104 and 122 are also aligned with openings 170 and 172 in the body 50 of the diverter 22 when the alignment key head 162 fits within alignment slot 164 of the permanent housing 24. Sealing means 180 and 182 provide a seal about the hydraulic fluid opening 170 while seal means 184 and 186 seal about the opening 172 with respect to the permanent housing 24 wall. Thus, there is provided according to the invention a means by which the diverter 22 is easily aligned both axially and angularly such that passages in the body wall of the diverter are aligned with the vent line and flow line means and with the hydraulic ports for operating the diverter.

Returning again to FIG. 2, the position of key 160 is seen when the diverter is in a normal, not actuated condition. The slots 190 and 192 illustrate the slots in the first piston or valve sleeve 56 and second piston or annular piston 58 which allow the sleeve and piston to move with respect to the fixed key 160. FIG. 3 illustrates the position of key 160 as the valve sleeve 56 and annular piston 58 have been moved upwardly during an emergency situation.

Illustrated in FIG. 2 is an outwardly extending annular space 200 which is provided to accept a test tool, thereby simulating a test pipe or other object extending through the bore of the housing about which the annular packing unit 52 may be closed in order to test the operation of the diverter.

FIGS. 5 through 10 illustrate the integral seal 140 provided in the wall 50 of the diverter 22 according to another aspect of the invention. The seal is adapted to be affixed within the wall about the opening 96 or the opening 98 in the body wall. Advantageously, the holes 96 and 98 are oblong on the interior of the body wall while circular on the exterior of the wall. The purpose for providing such a passage through the body wall is to minimize the height of the hole in the interior of the body wall while maintaining a maximum area of the outlet passage so as not to hinder significantly the flow therethrough thereby preventing creation of potentially hazardous back pressure during emergency venting. It is advantageous to provide according to the invention, an outlet passage of minimum height in the interior of the wall of the diverter so that less axial upward movement of the valve sleeve 56 is required to either open or close the hole. On the other hand, the vent line means 80 and the flow line means 82 normally are cylindrical tubular members having a circular opening, thereby requiring that the outlet on the exterior wall of the diverter be circular in shape.

Thus, an integral sealing member 140 is provided about the opening in the body wall which is advantageously provided to seal against the permanent housing on the exterior of the diverter wall and against the valve sleeve 56 movement on the interior of the diverter wall. According to another feature of the invention, the seal is embodied in a molded or cast member which may be easily manufactured obviating the necessity of machining two unusually shaped holes in each diverter housing which are costly and relatively difficult to machine. Thus, sealing member 140 is preferably an integral member of elastomeric material and preferably has a support member embedded therein to give it strength. Alternatively, sealing member 140 may be an integral member fabricated from non-elastomer materials. For example, it may be cast steel, ceramic or a composite material.

Figure 5:
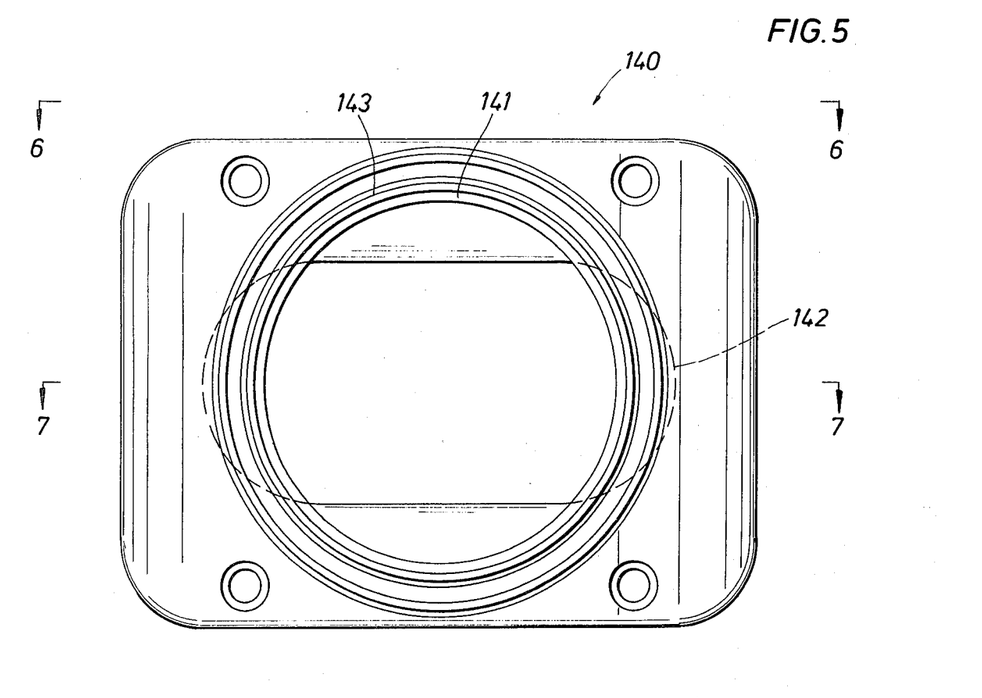
FIGS. 5 through 10 illustrate in various views and cross-sections a seal used to seal about an opening in the apparatus extending to either the vent line or flow line of the invention.

FIG. 5 illustrates the seal member as viewed from its exterior side showing the opening 141 on its outside being circular in nature and showing the interior oblong hole 142. Exterior sealing rings 143 are shown for sealing the permanent housing 142 against the exterior of the body diverter.

Figure 8:
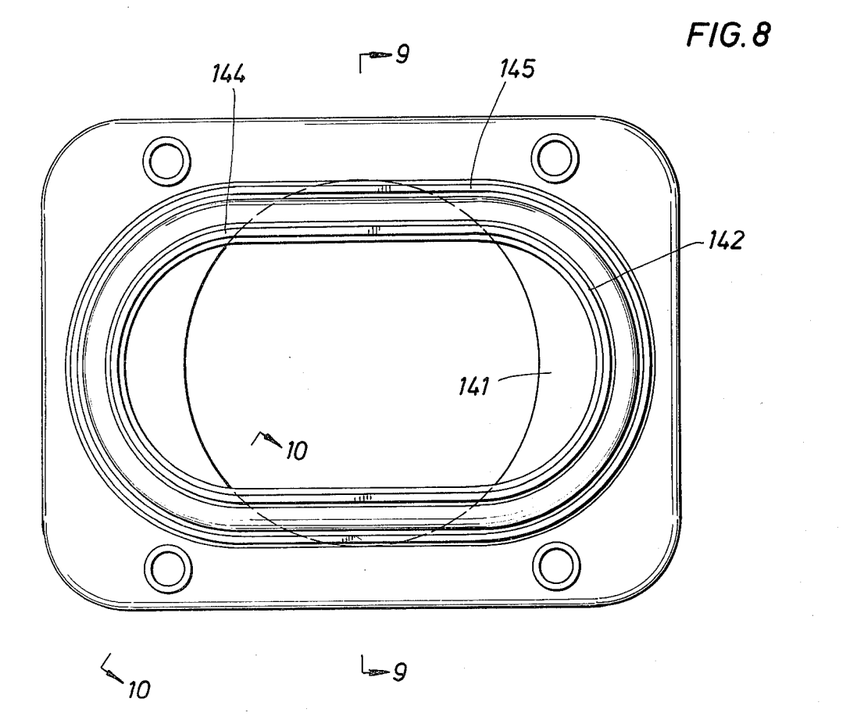

FIG. 8 shows the sealing element as viewed from the inside of the diverter showing the interior opening 142 being of oblong shape in which the height of the opening is less than its width. The exterior circular opening 141 is also illustrated. Interior sealing ridge 144 is provided for sealing against the valve sleeve 56 as it either comes into alignment with the opening 142 or seals the opening with an upper part of the sleeve where the vent line means is covered or the lower part of the piston where the flow line means is covered. Sealing shoulder 145 is provided for sealing the seal assembly 140 to the housing wall 50.

Figure 6:
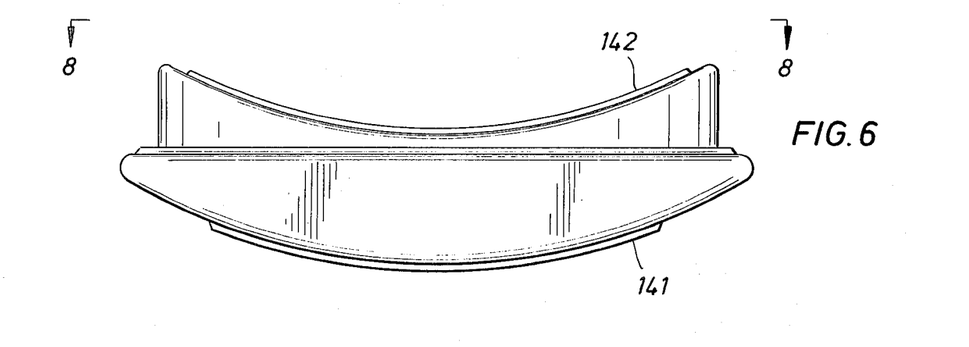
Figure 7:
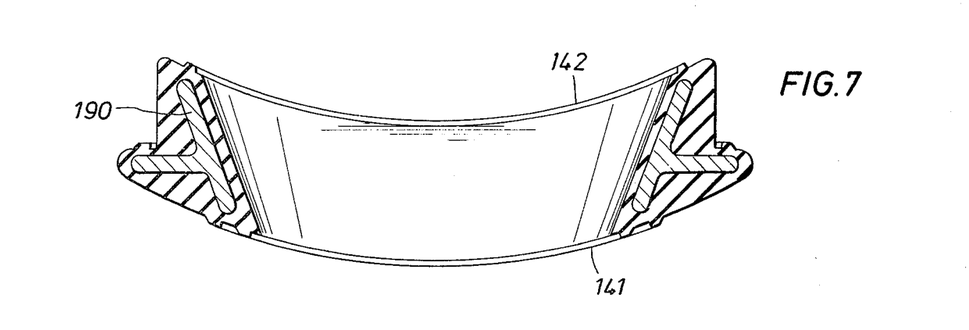

FIG. 6 illustrates the shape of the seal element when viewed from its side in which the oblong opening 142 is shown as well as the circular opening 141. Advantageously, a metallic support member 190 is provided in the seal element 140 and extends completely about the warped surface defined by the member connecting the circular opening 141 with the oblong opening 142.

Figure 9:
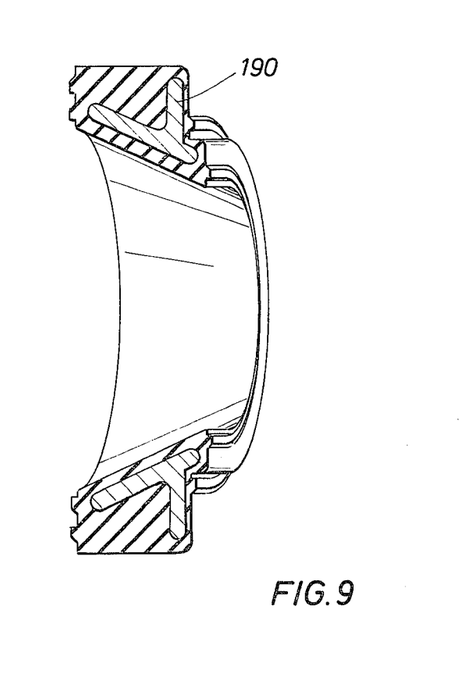
Figure 10:
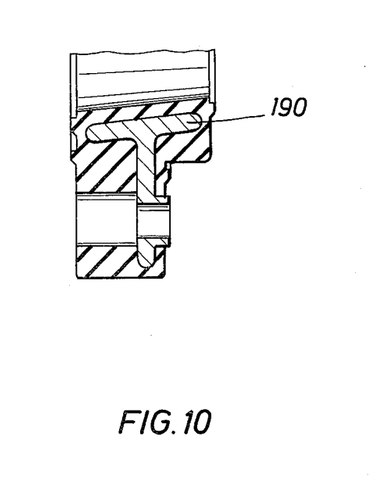

FIGS. 9 and 10 illustrate in cross-section how the support element 190 is preferably disposed within the sealing element itself.

Figure 11A:
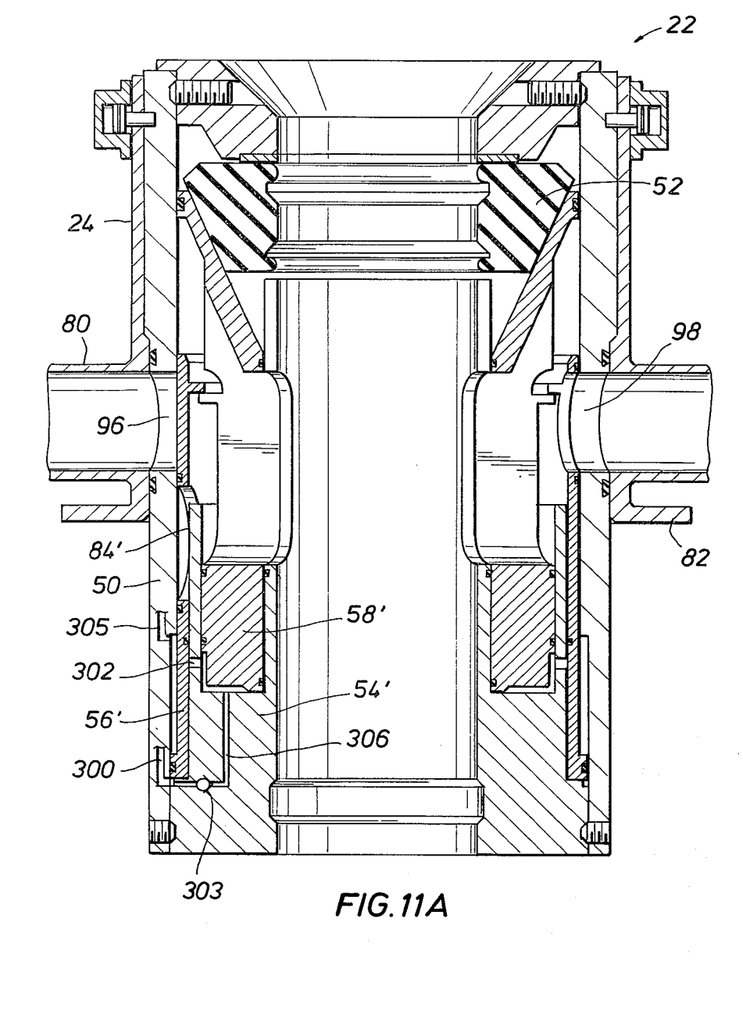
FIGS. 11A and 11B illustrate an alternative embodiment of the flow diverter in which two pistons are provided, a first piston serving to open and close the vent and flow lines, the second piston serving to urge the annular packing element radially inwardly and alternative, and sequencing means for insuring that the first piston moves before the second piston moves up.
Figure 11B:
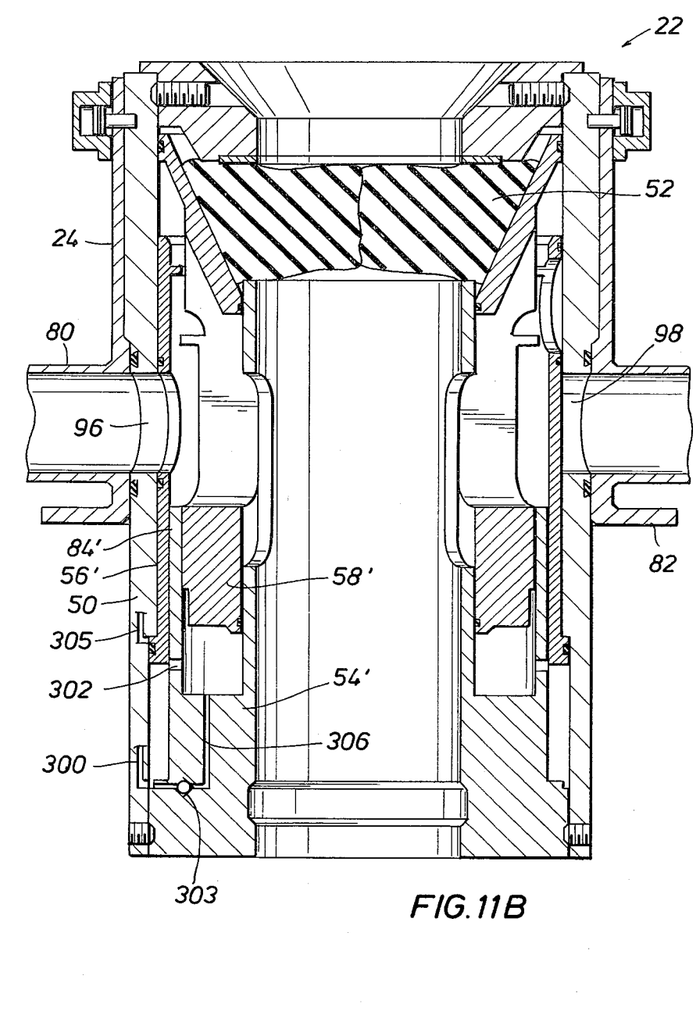

FIGS. 11A and 11B show an alternative embodiment of the flow diverter according to the invention. FIG. 11A shows the flow diverter in its normal or relaxed state. FIG. 11B shows it in the activated or diverting state. Flow diverter 22' is shown within permanently fixed housing 24 having a flow line means 82 and a vent line means 80 affixed to the housing. The diverter 22' has a body 50 and a base member 54'. The holes 96 and 98 are provided in the body wall for alignment with the vent line means 80 and the flow line means 82. A valve sleeve 56' and an annular piston 58' are provided in addition to the annular packing element 52 in the upper part of the diverter 22'. Holes are provided in the valve sleeve 56' and annular piston 58' similar to that shown in the embodiment of the invention shown in FIG. 2, but alternative sequencing means are provided for insuring that the valve sleeve 56' moves upwardly for closing the hole 98 to the flow line means and opening the hole 96 to the vent line means before the piston 58' is enabled to force the annular packing element 52 about a pipe or other object in the well bore or complete shut off on open hole.

The sequencing means includes means for connecting a source of pressurized hydraulic pressure via conduit 300 initially solely under the valve sleeve 56'. As the valve sleeve moves upwardly and comes to a final position such that the lower part of the valve sleeve 56' covers hole 98 and the hole 84' in the wall of the valve sleeve comes into alignment with the vent line means 80, a port 302 becomes uncovered, allowing the pressurized hydraulic fluid to be provided under the annular piston 58' thereby driving it upwardly and causing annular packing element 52 to close about a pipe or other object in the well bore or to completely close the annulus of the well bore in the absence of an object in the bore. A check valve 303 is provided such that when pressurized fluid is provided in conduit 305 in order to force the valve sleeve 56' downwardly, the downward movement of annular piston 58' forces hydraulic fluid down through conduit 306 and check valve 303 thereby relieving the pressure under annular piston 58'.

Figure 12A:
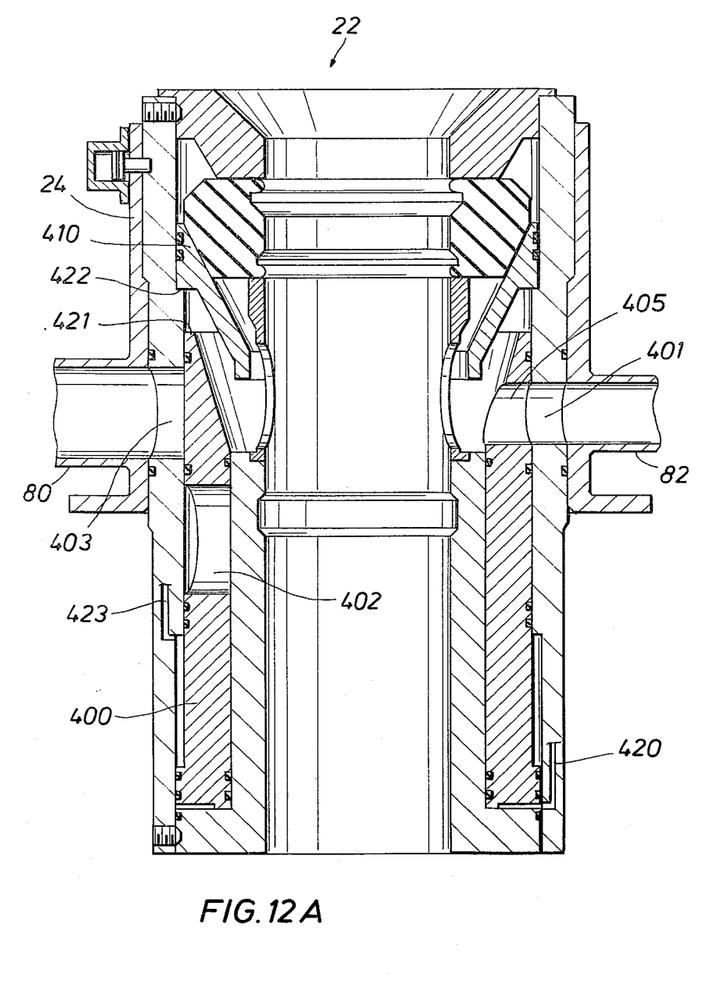
FIGS. 12A and 12B show another embodiment of the flow diverter in which two pistons are used to insure that the flow line to the shale shaker is closed and the vent line provided to flow pressurized fluid away from the drilling rig floor is open before the annular packing unit is closed about a pipe or other object in the bore hole.
Figure 12B:
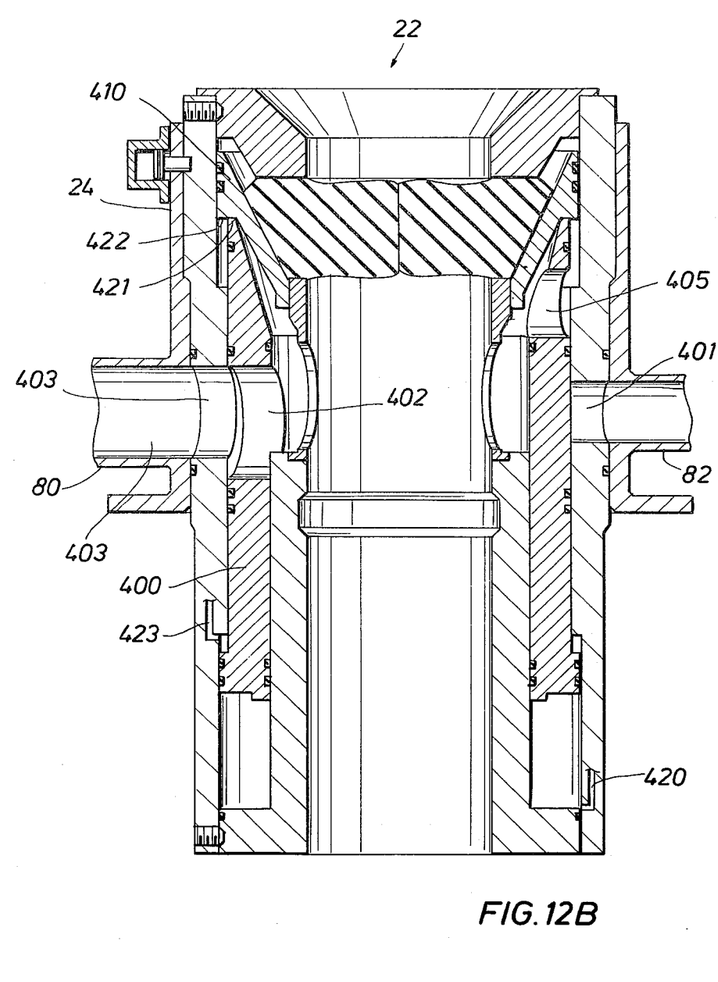

FIGS. 12A and 12B illustrate an alternative embodiment of the diverter according to the invention. FIG. 12A shows the diverter in its rest state; FIG. 12B shows the diverter in the diverting state with the packing element closing about the bore with no object therein. Again the diverter 22 is adapted to fit within the bore of a permanently fixed housing 24 below the rig floor of a drilling rig and above a drilling conduit. Flow line means 82 and vent line means 80 are provided for connection respectively to the drilling fluid system and for conducting pressurized fluid away from the drilling rig during an emergency. As shown in FIG. 12A, two pistons are provided by which a first piston 400 has two holes provided in its wall. Hole 405 is normally in alignment with the flow line means 82 while hole 402 is normally below the opening 403 in the wall of the diverter 22.

A second piston 410 is provided generally above the first piston 400 for engagement with the packing element 22. The means by which the sequencing of the first piston is forced upwardly before the second piston 410 is enabled to engage the packing element 22 is embodied by the upper head 421 of the first piston adapted for engagement with a lower shoulder 422 provided generally under the second piston 410. As a source of hydraulic pressure via conduit 420 is applied beneath the first piston 400, it is forced generally upward thereby closing hole 401 with a portion of the piston 400 below a hole in its wall 405. Hole 402 in the first piston wall 400 moves upward into alignment with hole 403 provided opposite the vent line means 80. A point is reached where the head 421 of the first piston 400 comes into engagement with the downward facing shoulder 422 of the second piston 410 whereby further upward movement of the piston 400 is transmitted via piston 410 to annular packing element 22 forcing it radially inward for closing about a pipe or other object disposed in the bore therein.

FIG. 12B illustrates the diverter in the closed position where the packing element has completely closed about the bore of the diverter. The first piston 400 has moved upwardly such that the flow line means 82 has been closed and the vent line means 80 has been opened.

Means for returning the pistons of the diverter to their normal position is provided via conduit 423 through which a source of pressurized hydraulic control fluid forces the first piston 400 back to its normal state. Piston 410 returns to its normal state because of gravity and because the packing element acts to return it to its relaxed state. Thus, as shown in FIGS. 12A and 12B, a mechanical means is provided for insuring that the pistons 400 and 410 sequence in operation such that the annulus of the diverter is not closed before the flow line means is closed and the vent line means is opened.

Figure 13A:
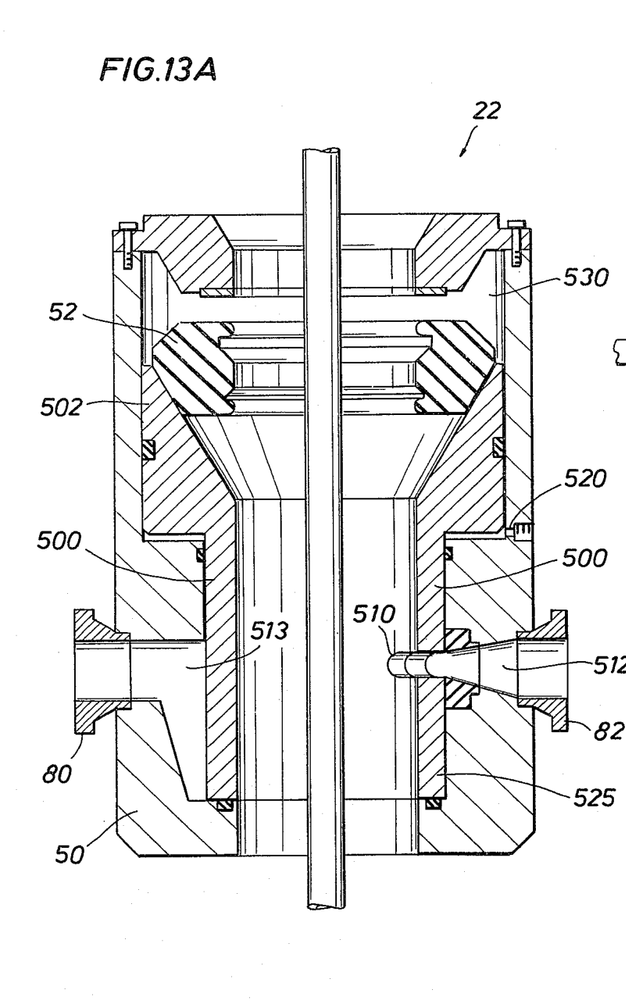
FIG. 13A illustrates another embodiment of the flow diverter apparatus in which a single piston serves to not only close the annular packing unit but also to simultaneously close the flow line and open the vent line before the packing unit may be closed.

FIG. 13A illustrates another embodiment of the flow diverter 22 in which a single piston 500 is provided not only for closing the annular packing element 52 about an object in the bore of the diverter but also for closing a flow line means 82 and opening a vent line means 80 during an emergency. The single piston 500 has an upper conical bowl portion 502 adapted for engagement with the packing element 52 and forcing it radially inward as the piston 500 moves axially upward. A hole 510 in the piston wall is normally in alignment with a hole 512 in the body 50 of the diverter 22. The second hole 513 in the body wall, provided in alignment with the vent line means 80, is covered by the piston 500 wall when the diverter is in its normal state. When a source of high pressure hydraulic fluid is provided beneath the piston 500 via conduit 520, piston 500 is forced upward thereby opening vent line means 80 via hole 513 providing fluid communication with the bore of the housing 22. As piston 500 moves up, hole 512 in the body wall becomes covered by the lower part 525 of piston 500, and ultimately, hole 512 becomes completely covered by the lower part 525 of the piston.

Means are provided for insuring that the packing element 52 does not close about a pipe or other object in the bore hole before hole 512 is covered and hole 513 is opened by providing a space 530 above the packing element through which the packing element is free to move axially upward without being forced radially inward as the upper conical portion 502 of the piston 500 moves up. Thus, a means is provided by which the vent line means 80 is opened and the flow line means 82 is closed from fluid communication with the bore of the flow diverter 22 before the annular packing element 52 is enabled to fully close about a pipe or other object in the bore hole or to completely close the bore of the diverter 22 in the absence of an object in the bore.

Figure 13B:
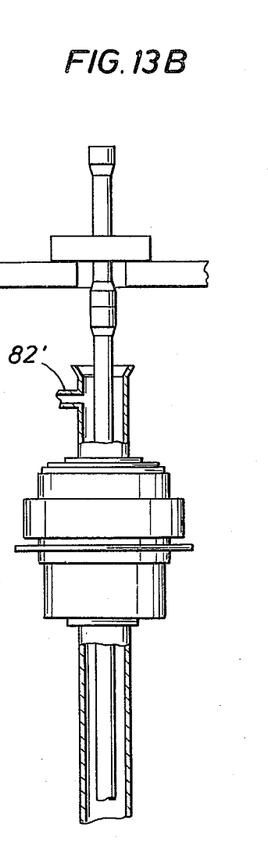
FIGS. 13B and 13C illustrate the single piston diverter of FIG. 13A having a single opening to the vent line, a flow line to the rig fluid system being provided above the diverter.

Alternatively, as illustrated in FIG. 13B, the flow line means 82 may not be provided in the wall of the piston at all, there being provided a flow line means 82' above the diverter through which the flow is normally directed to the fluid system of the drilling rig. For that arrangement, a single passage such as hole 513 of FIG. 13A to the vent line means is provided which is normally covered by the piston 500. The packing element serves to close all fluid communication to the flow line means, the vent line means serving to divert the flow of pressurized drilling fluid as the piston moves upwardly.

Figure 13C:
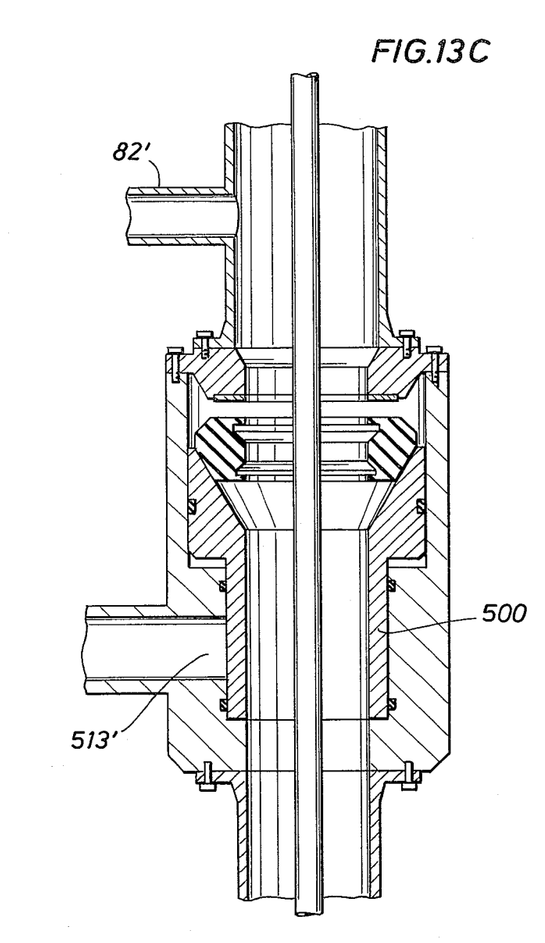

FIG. 13C illustrates an alternative embodiment of the diverter illustrated in FIG. 13A where piston 500 is required to move upward before hole 513' provided in body 50 is opened.

Thus, there has been described various embodiments of a diverter adapted for insertion into a permanently fixed housing connected to a drilling rig. The diverter, in a single apparatus, provides a substantially failsafe means for closing the bore of a drilling conduit to which the diverter is attached and for closing the flow line to the drilling fluid system of the rig and opening a vent line for diverting pressurized drilling fluid away from the drilling rig. Means have been provided to insure that the vent line is opened and the flow line to the shale shaker is closed before the annular packing element closes the annulus of the bore about a pipe or other object in the well. Sealing means by which the holes in the wall of the diverter are sealed interiorly to a piston moving past the hole and exteriorly to the permanent housing are also disclosed.

The flow diverter according to the invention is failsafe in that it eliminates the need for external valves in the vent line downstream of the connection of the vent line to the permanent housing of the diverter. Such valves, as indicated in the background section above, have been the source of negligence and failure when used with prior diverting systems, causing loss of property and injury to personnel.

Various modifications and alterations in the described structures will be apparent to those skilled in the art of the foregoing description which does not depart from the spirit of the invention. For this reason, these changes are desired to be included in the appended claims. The appended claims recite the only limitation to the present invention and the descriptive manner which is employed for setting forth the embodiments and is to be interpreted as illustrative and not limitative.

What is claimed is:

1. A seal for installation in the cylindrical outer wall of the housing of a flow diverter about an outlet passage through the housing wall, the outlet passage connecting an oblong hole in the interior of the wall with a substantially circular hole in the exterior of the wall, the seal comprising,
   an integral member having
      an outer section adapted to conform generally with the curvature of the outside of the cylindrical housing wall and having a generally circular opening therein with at least one generally circular sealing shoulder disposed outwardly from the circular opening,
      an inner section adapted to conform generally with the curvature of the inside of the cylindrical housing wall and having an oblong opening therein with a first oblong sealing shoulder disposed outwardly from the oblong opening,
      a connecting section between the outer section and inner section having a bore therein connecting the circular hole with the oblong hole; and
   means for sealing the seal to the housing wall.

2. The seal of claim 1 wherein said integral member is constructed of elastomeric material.

3. The seal of claim 1 wherein said integral member is constructed of steel and said circular sealing shoulder and said oblong sealing shoulder are constructed of elastomeric material.

4. The seal of claim 1 wherein said integral member is constructed of ceramic material and said circular sealing shoulder and said oblong sealing shoulder are constructed of elastomeric material.

5. The seal of claim 1 wherein said integral member is constructed of composite material and said circular sealing shoulder and said oblong sealing shoulder are constructed of elastomeric material.

6. The seal of claim 2 having at least one rigid support member embedded in the elastomeric material.

7. The seal of claim 6 wherein an integral rigid support member is embedded within the member of elastomeric material and has an outer section disposed about the outer opening, an inner section disposed about the warped surface defined by the bore connecting the circular hole with the oblong hole and an inner section disposed about the inner opening.

8. The seal of claim 1 wherein the means for sealing the seal to the housing wall is a second oblong sealing shoulder disposed on said inner section and outwardly from said first oblong sealing shoulder.

9. A seal for installation in the cylindrical outer wall of the housing of a flow diverter about an outlet passage through the housing wall, the outlet passage connecting an oblong hole in the interior of the wall with a substantially circular hole in the exterior of the wall, the seal comprising, an outer section adapted to conform generally with the curvature of the outside of the cylindrical housing wall and having a generally circular opening therein with at least one generally circular sealing shoulder disposed outwardly from the circular opening, an inner section adapted to conform generally with the curvature of the inside of the cylindrical housing wall and having an oblong opening therein with a first oblong sealing shoulder disposed outwardly from the oblong opening, a connecting section between the outer section and inner section having a bore therein connecting the circular hole with the oblong hole; and a second oblong sealing shoulder disposed on said inner section and outwardly from said first oblong sealing shoulder.

* * * * *